(12) United States Patent
DiCroce et al.

(10) Patent No.: US 7,962,260 B2
(45) Date of Patent: Jun. 14, 2011

(54) REMOTE PROGRAMMER FOR A VEHICLE CONTROL SYSTEM

(75) Inventors: John DiCroce, Oceanside, NY (US); Shane Wilson, Clinton Township, MI (US); Peter Stouffer, Holly, MI (US)

(73) Assignee: Audiovox Corporation, Hauppauge, NY (US)

( * ) Notice: Subject to any disclaimer, the term of this patent is extended or adjusted under 35 U.S.C. 154(b) by 191 days.

(21) Appl. No.: 11/761,575

(22) Filed: Jun. 12, 2007

(65) Prior Publication Data
US 2007/0233342 A1 Oct. 4, 2007

Related U.S. Application Data

(63) Continuation of application No. 10/851,831, filed on May 21, 2004, now abandoned, which is a continuation-in-part of application No. 10/085,791, filed on Feb. 28, 2002, now Pat. No. 7,069,127, which is a continuation of application No. 09/907,744, filed on Jul. 19, 2001, now Pat. No. 6,697,719.

(51) Int. Cl.
*G06F 7/00* (2006.01)
(52) U.S. Cl. .............................. 701/36; 701/2
(58) Field of Classification Search .................. 701/36, 701/2; 340/426.13
See application file for complete search history.

(56) References Cited

U.S. PATENT DOCUMENTS

| | | | |
|---|---|---|---|
| 4,698,748 A | 10/1987 | Juzswik et al. ............... 713/322 |
| 5,081,667 A | 1/1992 | Drori et al. ................. 455/404.1 |
| 5,424,720 A | 6/1995 | Kirkpatrick | |
| 5,479,157 A | 12/1995 | Suman et al. | |
| 5,578,300 A | 11/1996 | Schmidt et al. ............ 424/78.08 |
| 5,758,300 A | 5/1998 | Abe | |
| 6,028,533 A | 2/2000 | Javors | |
| 6,094,609 A | 7/2000 | Arjomand | |
| 6,184,779 B1 | 2/2001 | Chen ........................ 340/425.5 |
| 6,253,129 B1 | 6/2001 | Jenkins et al. | |
| 6,297,731 B1 | 10/2001 | Flick | |
| 6,452,483 B2 | 9/2002 | Chen et al. ................. 340/425.5 |
| 6,697,719 B2 * | 2/2004 | Stouffer et al. ................. 701/36 |
| 6,785,595 B2 | 8/2004 | Kominami et al. | |
| 7,069,127 B2 * | 6/2006 | Stouffer et al. ................. 701/36 |
| 7,319,847 B2 | 1/2008 | Xanthos et al. ............ 455/67.11 |
| 2001/0013833 A1 | 8/2001 | Chen et al. | |
| 2001/0041566 A1 | 11/2001 | Xanthos et al. ............... 455/423 |

(Continued)

OTHER PUBLICATIONS

Control strategy optimization of the hybrid electric bus based on remote self-learning driving cycles; Zhu Daowei et al.; Vehicle Power and Propulsion Conference, 2008. VPPC '08. IEEE; Digital Object Identifier: 10.1109/VPPC.2008.4677703; Publication Year: 2008, pp. 1-5.

(Continued)

*Primary Examiner* — Cuong H Nguyen
(74) *Attorney, Agent, or Firm* — F. Chau & Associates, LLC

(57) ABSTRACT

A remote programmer for remotely programming a vehicle control system is provided. The remote programmer includes a display, an input for receiving user input data, a first interface for interfacing with a computer, wherein the first interface receives data associated with programming the vehicle control system from the computer; a transmitter for wirelessly transmitting the data associated with programming the vehicle control system to the vehicle control system; and a controller for controlling operations of the remote programmer, wherein the controller stores the data associated with programming the vehicle control system and controls operations of the first interface and the transmitter in accordance with the user input data.

15 Claims, 9 Drawing Sheets

U.S. PATENT DOCUMENTS

| | | | |
|---|---|---|---|
| 2004/0090315 A1* | 5/2004 | Mackjust et al. | 340/426.13 |
| 2005/0283285 A1 | 12/2005 | Ying | |
| 2007/0233342 A1* | 10/2007 | DiCroce et al. | 701/36 |

OTHER PUBLICATIONS

Analysis of attacks against the security of keyless-entry systems for vehicles and suggestions for improved designs; Alrabady, A.I. et al.; Vehicular Technology, IEEE Transactions on; vol. 54, Issue: 1, Digital Object Identifier: 10.1109/TVT.2004.838829; Publication Year: 2005, pp. 41-50.

Implementation of inter-vehicle communication system for vehicle platoon experiments via testbed; Tae Min Kim et al.; SICE 2003 Annual Conference; vol. 3; Digital Object Identifier: 10.1109/SICE.2003.1323938; Publication Year: 2003, pp. 3414-3419 vol. 3.

Compact planar antennas for short-range wireless automotive communication; Al-Khateeb, B. et al.; Vehicular Technology, IEEE Transactions on; vol. 55, Issue: 4; Digital Object Identifier: 10.1109/TVT.2006.877474; Publication Year: 2006, pp. 1425-1435.

Office Action dated Oct. 2, 2006 in corresponding U.S. Appl. No. 10/851,831.
Office Action dated Mar. 28, 2007 in corresponding U.S. Appl. No. 10/851,831.
Office Action dated Apr. 1, 2005 in corresponding U.S. Appl. No. 10/085,791.
Office Action dated Jul. 11, 2005 in corresponding U.S. Appl. No. 10/085,791.
Notice of Allowance dated Oct. 27, 2005 in corresponding U.S. Appl. No. 10/085,791.
Office Action dated Nov. 12, 2002 in corresponding U.S. Appl. No. 09/907,744.
Office Action dated Jun. 27, 2002 in corresponding U.S. Appl. No. 09/907,744.
Office Action dated Feb. 4, 2003 in corresponding U.S. Appl. No. 09/907,744.
Office Action dated Apr. 30, 2003 in corresponding U.S. Appl. No. 09/907,744.
Notice of Allowance dated Oct. 15, 2003 in corresponding U.S. Appl. No. 09/907,744.

* cited by examiner

REMOTE PROGRAMMER FOR A VEHICLE CONTROL SYSTEM

CROSS-REFERENCE TO RELATED APPLICATIONS

This application is a continuation of application Ser. No. 10/851,831, filed May 21, 2004 now abandoned, which is a continuation-in-part of application Ser. No. 10/085,791, filed Feb. 28, 2002, now U.S. Pat. No. 7,069,127, which is a continuation of application Ser. No. 09/907,744, filed on Jul. 19, 2001, now U.S. Pat. No. 6,697,719, the disclosures of which are all incorporated by reference herein in their entirety.

BACKGROUND OF THE INVENTION

1. Technical Field

The present invention relates to an apparatus for adding functionality to an electronic device and/or system, and more particularly, to a remote programmer for use with a vehicle control system.

2. Discussion of the Related Art

In general, electronic devices are utilized to provide a variety of functions to a user. As technology evolves and/or as users needs evolve, there may be a need or desire to change and/or upgrade the functions that an electronic device can provide.

Vehicle security and alarm systems provide a user with specific functions according to the design and features of the vehicle security and alarm systems. Vehicle security and alarm systems are either pre-installed during the manufacture of the vehicle or purchased and installed as aftermarket items.

Currently, if a user desires functions that are not provided in, for example, an original equipment alarm, an aftermarket security and alarm system would need to be purchased. Users are also faced with limited options or feature sets for alarms. They must either choose the factory installed vehicle security and alarm system or choose an aftermarket vehicle security and alarm system that ordinarily provide a pre-determined set of features.

Thus, if a user desires features that are not included in the pre-determined set of features, or if the features desired by a user change, the user would need to install a different vehicle security and alarm system. In addition, as technology changes, users who desire to acquire functions which incorporate evolved technology need to acquire a new system that incorporates the evolved technology.

It is therefore desirable to provide an electronic device and/or system that can be updated to change, add, or remove functions that the electronic device can provide. For example, it is desirable to provide a vehicle control system and/or device that can be utilized to provide a variety of security, alarm, comfort and convenience functions related to a vehicle and/or a user of a vehicle, as a user's needs change or as new functions become available in the marketplace.

It is also desirable to provide a remote device for providing the vehicle control system and/or device with new features and/or functions available in the marketplace. For example, it is desirable to provide a remote device that is capable of efficiently receiving new features and/or functions from an external source and for providing the new features and/or functions to the vehicle control system and/or device in a cost effective manner.

SUMMARY OF THE INVENTION

The present invention overcomes the foregoing and other problems encountered in the known teachings by providing a remote programmer for remotely programming a vehicle control system.

In one embodiment of the present invention, a remote programmer for remotely programming a vehicle control system comprises: a display; an input for receiving user input data; a first interface for interfacing with a computer, wherein the first interface receives data associated with programming the vehicle control system from the computer; a transmitter for wirelessly transmitting the data associated with programming the vehicle control system to the vehicle control system; and a controller for controlling operations of the remote programmer, wherein the controller stores the data associated with programming the vehicle control system and controls operations of the first interface and the transmitter in accordance with the user input data. The remote programmer further comprises a second interface for interfacing with a memory card, wherein the memory card comprises the data associated with programming the vehicle control system.

The first interface is one of a universal serial bus (USB), Ethernet, FireWire, radio frequency (RF), and infrared (IR) interface. The input is one of a keypad and a graphical user interface. The display comprises a graphical user interface. The transmitter is one of an RF transmitter, an RF transceiver, and an IR transceiver. The data associated with programming the vehicle control system comprises codes for defining a feature set of electronically operable functions of the vehicle control system.

In another embodiment of the present invention, a system for remotely programming a vehicle control system comprises: an interface module for interfacing with an electronic input and output device of a vehicle, wherein the electronic input and output devices are operated pursuant to a feature set of electronically operable functions; a feature set module for detachably coupling to said interface module, wherein the feature set module comprises codes for defining the feature set of electronically operable functions; and a remote programmer for remotely programming the feature set module, wherein the remote programmer transmits the codes for defining the feature set of electronically operable functions to the interface module.

The system further comprises a computer for providing the remote programmer with the codes for defining the feature set of electronically operable functions, and a software cartridge for detachably coupling to the interface module, wherein the software cartridge comprises the codes for defining the feature set of electronically operable functions. The software cartridge is remotely programmed by the remote programmer and the electronic input and output devices are part of one of a vehicle security system, a keyless entry system, a user convenience system, and an entertainment system.

The interface module comprises an RF receiver for receiving the codes for defining the feature set of electronically operable functions. The interface module may also comprise an IR transceiver for performing one of receiving the codes for defining the feature set of electronically operable functions, and transmitting a signal to erase the codes for defining the feature set of electronically operable functions stored in the remote programmer. The feature set module further comprises a memory device for storing the codes for defining the feature set of electronically operable functions. The remote programmer comprises: a display; an input for receiving user input data; a first interface for interfacing with a computer, wherein the first interface receives the codes for defining the feature set of electronically operable functions from the computer; an RF transmitter for wirelessly transmitting the codes for defining the feature set of electronically operable functions to the interface module; and a controller for controlling operations of the remote programmer, wherein the controller stores the information associated with programming the vehicle control system and controls operations of the first interface and the RF transmitter in accordance with the user input data. The remote programmer further comprises a second interface for interfacing with a memory card, wherein the memory card comprises the codes for defining the feature set of electronically operable functions. The remote programmer may further comprise an IR transceiver for performing one of receiving the codes for defining the feature set of electronically operable functions from a computer, and transmitting the codes for defining the feature set of electronically operable functions to the interface module.

In yet another embodiment of the present invention, a system for remotely programming a vehicle control system comprises: an interface module for interfacing with an electronic input and output device of a vehicle, wherein the electronic input and output devices are operated pursuant to a feature set of electronically operable functions; a software module for detachably coupling to said interface module, wherein the software module comprises codes for defining the feature set of electronically operable functions; and a remote programmer for remotely programming the software module, wherein the remote programmer transmits the codes for defining the feature set of electronically operable functions to the software module.

In another embodiment of the present invention, a method for remotely programming a vehicle control system via a remote programmer, the vehicle control system comprising an interface module for interfacing with an electronic input and output device of a vehicle, and a feature set module for detachably coupling to said interface module, wherein said feature set module comprises codes for defining a feature set of electronically operable functions to operate the electronic input and output devices, comprises the steps of: determining, at the remote programmer, a code to be transmitted to the interface module for programming, wherein the code to be transmitted is associated with a function in the feature set of electronically operable functions; and transmitting, to the interface module, the code for programming the function of the feature set of electronically operable functions; receiving, at the interface module, the code for programming the function of the feature set of electronically operable functions; and executing, at the interface module, the code for programming the function of the feature set of electronically operable functions. The remote programmer transmits the codes for programming the function of the feature set of electronically operable functions to the interface module via one of an RF transmitter, an RF transceiver, and an IR transceiver.

The method further comprises storing, at the feature set module, the code for programming the function of the feature set of electronically operable functions in a memory, and requesting, at the remote programmer, the code for programming the function of the feature set of electronically operable functions from a computer comprising a plurality of codes for defining the feature set of electronically operable functions; and receiving, at the remote programmer, the code for programming the function of the feature set of electronically operable functions. The remote programmer interfaces with the computer via one of a USB, Ethernet, FireWire, RF, and IR interface.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
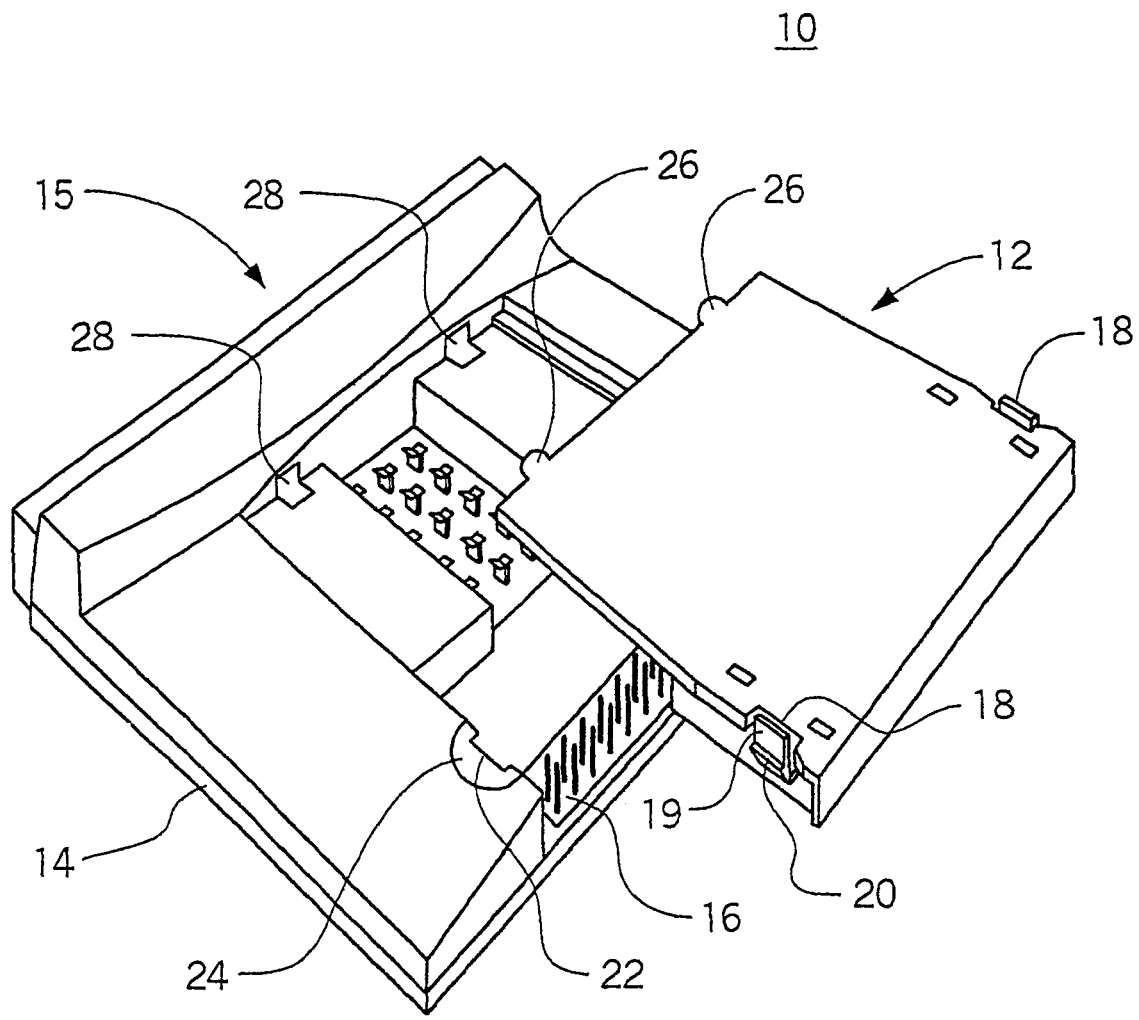
FIG. 1 is a perspective view of a vehicle control and/or alarm system according to an exemplary embodiment of the present invention.

Referring now to the figures wherein like reference numerals indicate like elements, in FIG. 1 there is shown a vehicle control and/or alarm system 10, including an interface module 15 and a feature set module 12. The feature set module 12 may include a computer processor and/or memory storing device that can be utilized to define the functions/features of the alarm system. Additionally, the feature set module 12 may include computer processing hardware and/or software that are replaceable and/or capable of being upgraded, converted or configured differently. Thus, the feature set module 12, according to the present invention, is able to provide a multitude of alarm features.

FIG. 1 illustrates the control system 10, which includes the feature set module 12, according to an exemplary embodiment of the present invention that may be coupled to interface module 15 to provide alarm and/or security features. The feature set module 12 includes one or more structures for securing the feature set module 12 to the housing 14 of the interface module 15.

For example, the feature set module 12 may be attached to the housing 14 by a housing port 16, which may be a pin or receptacle connector on the housing 14 that can accept the feature set module 12. In an exemplary embodiment, the module 12 may include a module port 17 (shown in FIG. 7). The module port 17 may include a pin receptacle connector with up to 40 pin receptacles, and the housing port 16 of the housing 14 may include a 40-pin connector. It should be understood that the connectors of the port 17 and the port 16 could be provided with more, or less, than 40 pins depending on the features to be provided by the control system 10, and the connection established may be a serial or parallel connection. The housing port 16 and the module port 17 may have any number or type of terminal. The housing port 16 serves as the mechanism for establishing communication between the interface module 15 and the feature set module 12.

The feature set module 12 may also be attached to the housing 14 by one or more locking members 18. In an exemplary embodiment, the housing of the feature set module 12 and the locking members 18 are a molded plastic. Each of the locking members 18 has a first end connected to the housing and a second free end 19. Applying pressure against the free end 19 causes the locking member 18 to flex. The locking member 18 is provided with a locking portion 20 that fits into a cavity member 22 of the housing 14 to secure the feature set module 12 to the housing 14. By applying pressure to each of the locking members 18 toward each other, the free ends 19 of the locking portions 20 are released from the cavity members 22 to release the feature set module 12 from the interface module 15.

Positioned adjacent the locking members 18 on the interface module 15 are grooves 24 that are provided to facilitate attaching the feature set module 12 to the housing 14 or detaching the feature set module 12 from the housing 14. The feature set module 12 may have one or more tabs 26 at one end of the feature set module 12. The housing 14 may have cavities 28 for accommodating the tabs 26.

Figure 2:
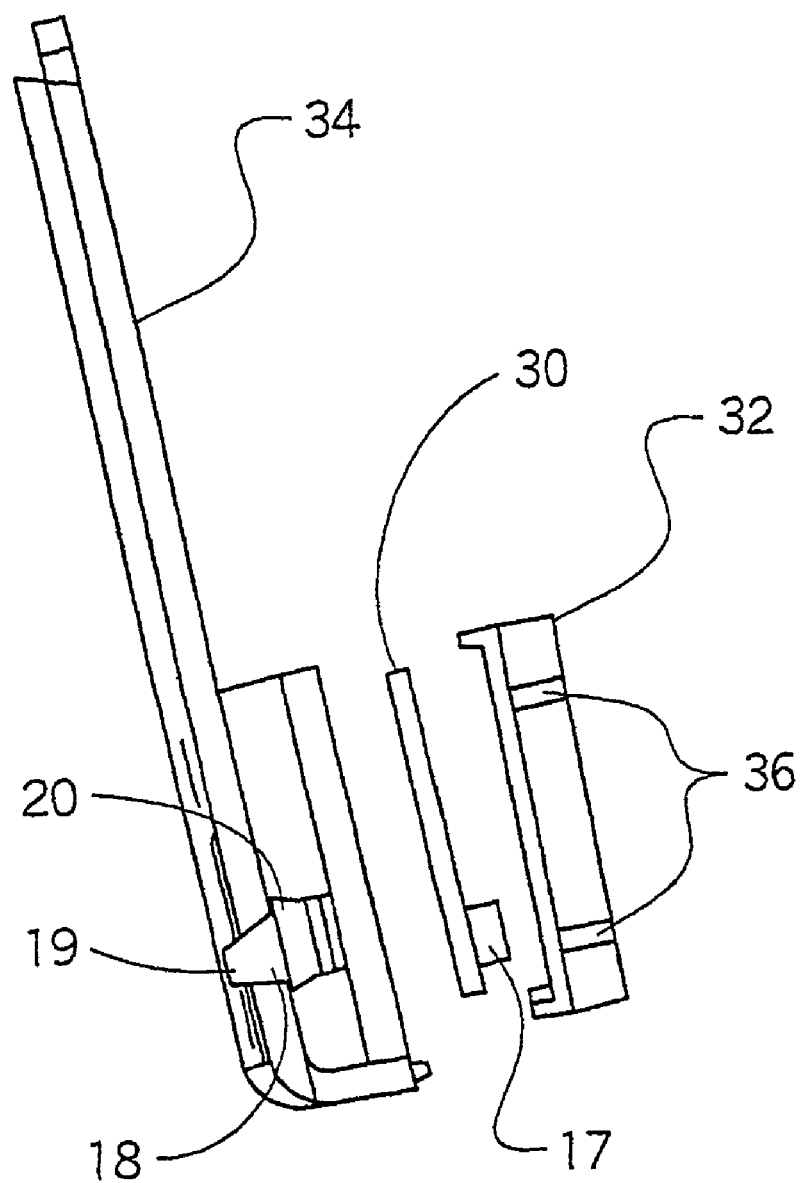
FIG. 2 is an exploded plan view of the side of a feature set module according to an exemplary embodiment of the present invention.
Figure 3:
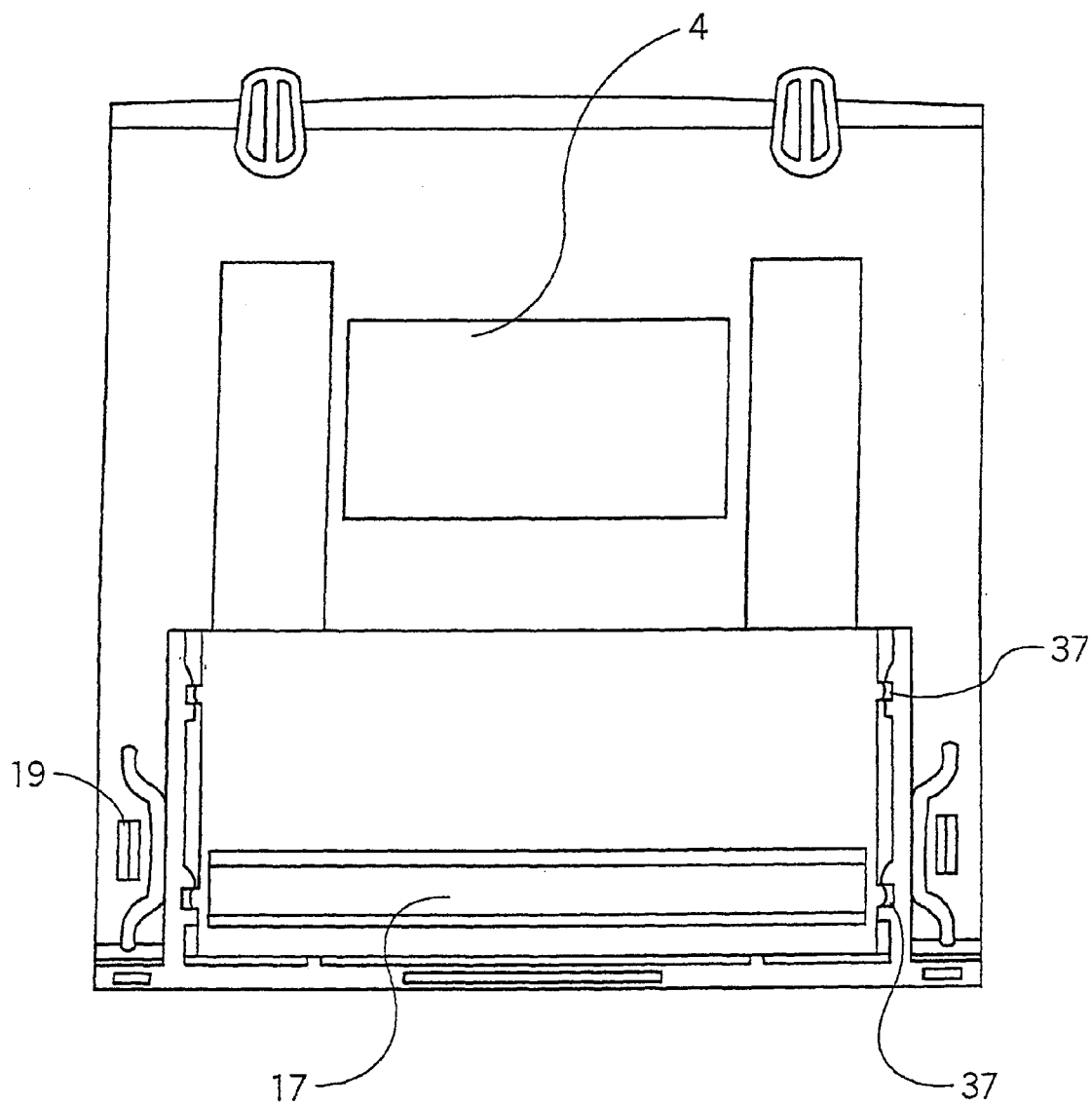
FIG. 3 is a plan view of the feature set module according to an exemplary embodiment of the present invention.

The feature set module 12 can be utilized for defining features or functions of the control system 10. The feature set module 12 may also include circuitry for processing the features and functions that the feature set module 12 is designed to provide. The feature set module 12 is designed to be programmed for providing different features and functions. As shown in FIG. 2, the feature set module 12 may include a circuit board 30 containing hardware and/or software for storing and processing the features/functions that the feature set module 12 is to provide. Alternatively, an electrically erasable programmable read-only memory (EEPROM) device, a plug in module, a plug in read-only memory (ROM) device, or an external EEPROM device may be utilized to perform processing and/or storing functions. In an exemplary embodiment, as shown in FIG. 2, the circuit board 30 can be accommodated in a bottom housing 32 of the feature set module 12. The bottom housing 32 includes ridges 36 that fit within channels 37 in the top housing 34 for securing the bottom housing 32 to the top housing 34. Alternatively, the circuit board 30 and/or the bottom housing 32 may include a structure for securing the circuit board 30 and/or the bottom housing 32 to the top housing 34. The bottom housing 32 is provided with an opening to allow access to the pin receptacle 17. An exemplary embodiment of the assembly of the top housing 34, circuit board 30, and bottom housing 32 is shown in FIG. 3.

Figure 4:
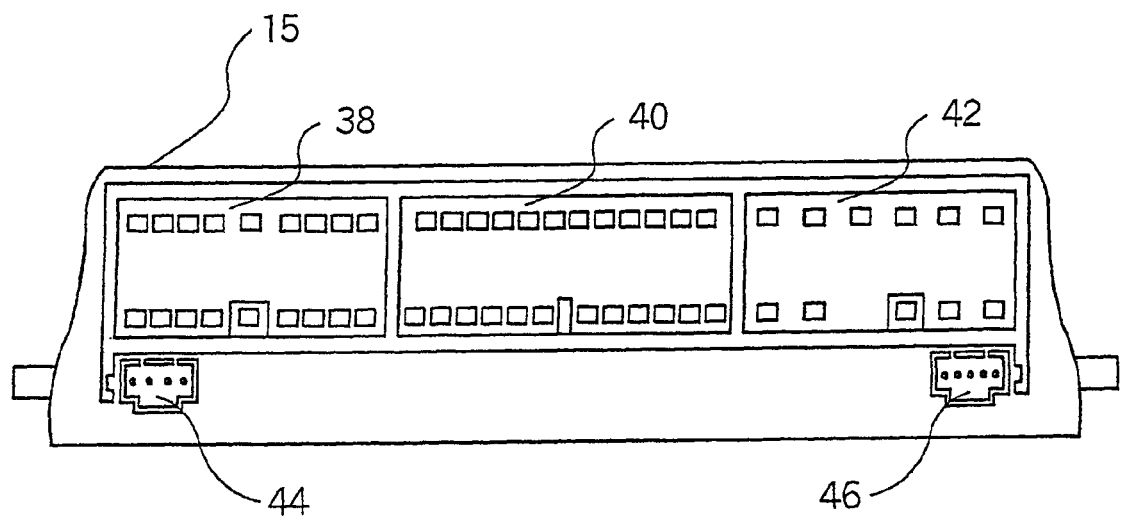
FIG. 4 is a plan view of a vehicle control and/or alarm system according to an exemplary embodiment of the present invention.

As shown in FIG. 4, the control system 10 may also include ports having pin receptacles that can be utilized to connect the interface module 15 and other components, e.g., siren, ignition system, motion sensor, lights, etc., of the control and/or alarm system 10. In the vehicle control system 10, the feature set module 12 may be used to configure safety, security, and other function/features related to a vehicle and/or a user of a vehicle. Thus, the interface module 15 may serve as an input/output interface with relays and transistors to drive external loads, i.e., loads associated with the control system 10. The control system 10 may also include various sensors, such as an on-board shock sensor and an interior theft sensor, which can be utilized to protect the vehicle's security, and which may be enabled by the feature set module 12. An example of an on-board shock sensor is described in U.S. Pat. No. 6,043,734 to Mueller et al., the disclosure of which is incorporated by reference herein in its entirety. The interface module 15 may also include a radio frequency (RF) receiver 96 (shown in FIG. 9) that is able to receive signals from a transmitter, so that the features/functions of the feature set module 12 and/or vehicle control system 10 can be operated remotely. It is to be understood that interface module 15 may also include an infrared (IR) receiver for receiving signals from, for example, a remote transmitter. As shown in FIG. 4, the interface module 15 may have various ports for interfacing with external loads, such as a port to interface with a means for overriding a vehicle immobilizer, a port for interfacing with a multiplex module, and/or a port for interface with a hardware/software cartridge 48 (shown in FIG. 5).

Five ports 38, 40, 42, 44, and 46 are shown in FIG. 4. In FIG. 4, port 38 is utilized to provide a number of auxiliary outputs to control features/functions, such as the opening and closing of windows, the turning on and off of headlights, etc. Port 40 interfaces with the hardware/software cartridge 48 and is utilized for inputs and outputs used in security and keyless entry applications, such as those related to a door pin-switch monitor, ignition switches, 12V monitor, power, ground, siren output, etc. Port 42 is utilized to enable start feature sets, such as crank output, ignition feed, heater control feed, tachometer monitor input, etc. Port 44 is utilized as an auxiliary RF receiver connector port, and allows an alternative receiver to be connected to the system for the purpose of changing the frequency range and/or RF technology that will, for example, allow changing a distance from the vehicle that a user of a vehicle control system, in accordance with the present invention, will be able to activate and/or deactivate features of the vehicle control system. In an exemplary embodiment, a user will be able to extend the distance, for operation of the vehicle control system, to several thousand feet. Port 46 is utilized as a remote start security bypass module connection and provides inputs and outputs to control electronics that are responsible for overriding factory security systems before remote start can occur. Although five ports are shown in FIG. 4, the electronic device 15 may have more or less ports.

Figure 5:
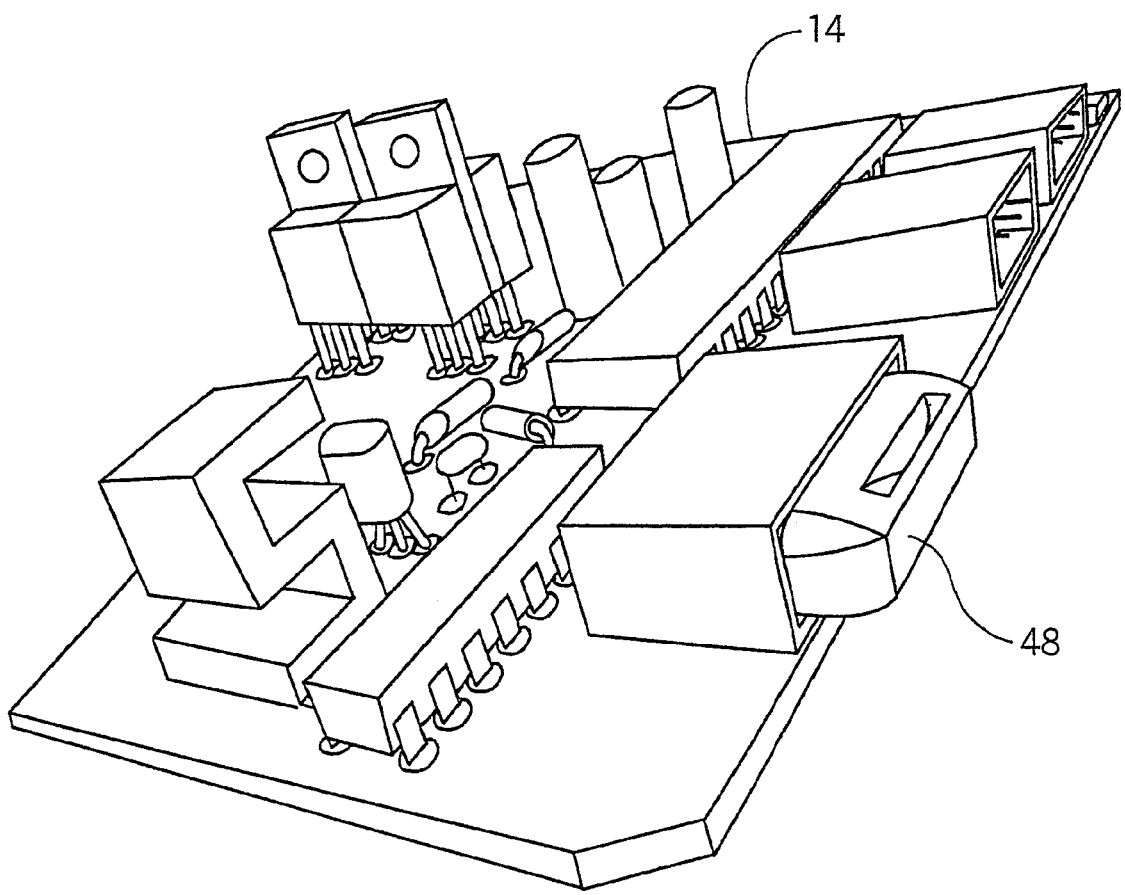
FIG. 5 is a perspective view of the vehicle control and/or alarm system including a software cartridge according to another exemplary embodiment of the present invention.

A separate exemplary embodiment of the software cartridge 48 is shown in FIG. 5. The software cartridge 48 is coupled to the interface module 15 through one of the ports 38, 40, 42, 44, and 46 and can be programmed to enable the feature set module 12 to provide various features and functions. The feature set module 12 can be used in conjunction with software cartridge 48 to produce vehicle control systems with different sets of features and functions. Upon attaching the feature set module 12 to the housing port 16 on the interface module 15, the software cartridge 48 can be utilized alone or in conjunction with feature set module 12 to control and/or define functions associated with the control system 10, such as a vehicle control system and/or a user of a vehicle control system. A vehicle control system according to the present invention can be utilized to provide, but is not limited to, the features/functions described herein. For example, the feature set module 12 can be utilized to control security, safety, comfort and convenience functions related to a vehicle control system and/or a user of a vehicle control system, by programming the software cartridge 48 to provide various features and functions.

Figure 6:
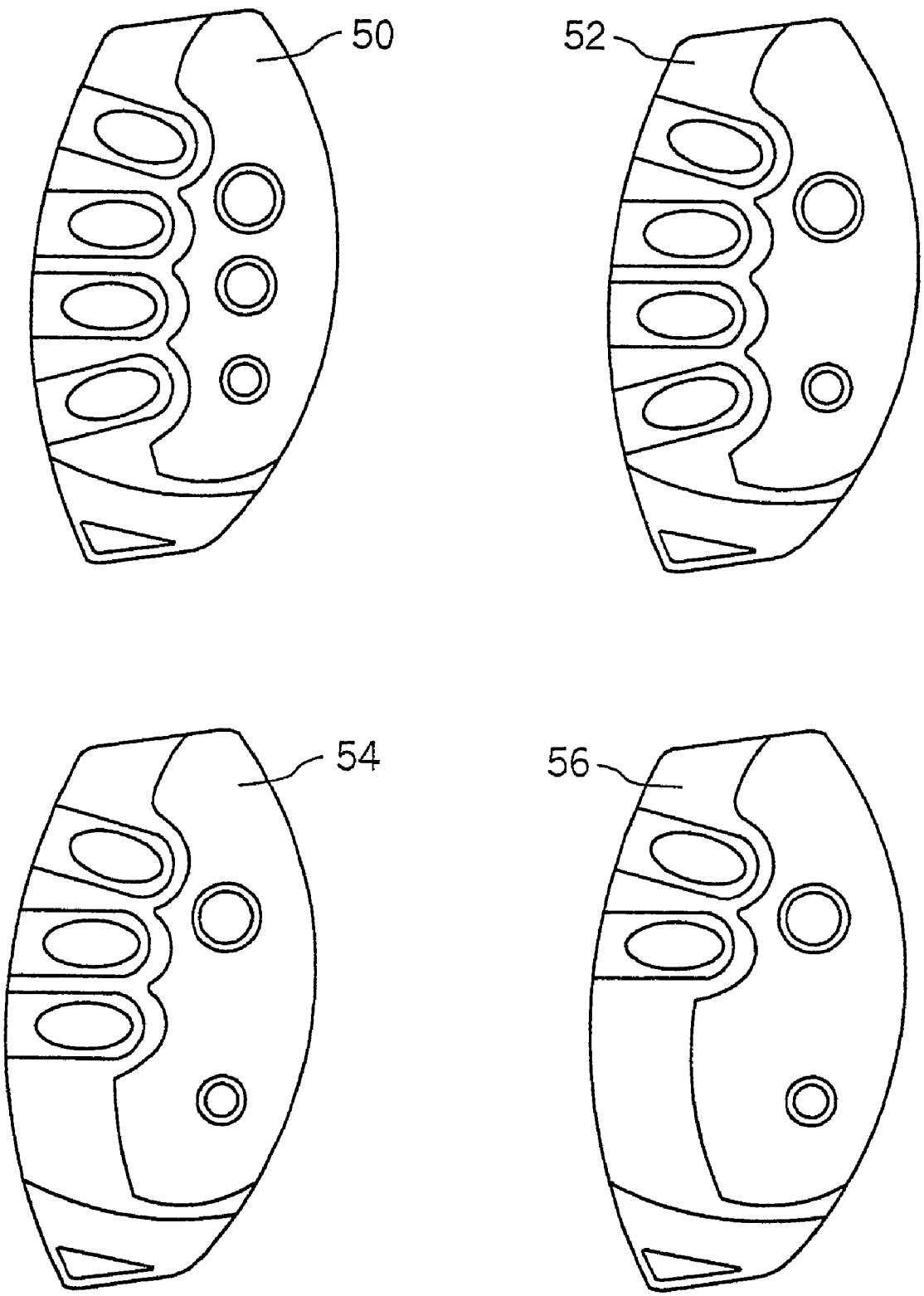
FIG. 6 is a plan view of several transmitters according to an exemplary embodiment of the present invention.

An exemplary control system 10, according to the present invention, can be utilized to allow a transmitter, such as one of several transmitters 50, 52, 54, and 56 shown in FIG. 6, to remotely control the functions of the electronic system by activating and/or deactivating functions, either automatically, by the use of a transmitter/remote control, or both. In general, the transmitter, according to the present invention, can send signals, and thus, allow a user to operate the transmitter to activate and/or deactivate certain features/functions of the interface module 15. One or more than one of the several transmitters 50, 52, 54, and 56 may be configured to operate as a transceiver that is able to receive signals.

The feature set module 12, according to the present invention can be programmed to allow a transmitter/remote control or a remote programmer to be utilized for: 1) locking and unlocking doors with ignition off; 2) releasing a trunk or hatch; 3) disabling or enabling a starter; 4) flashing lights, such as parking lights; 5) controlling functions associated with one or more vehicles, for example, by use of a shift key located on the transmitter/remote control; 6) allowing one or more remotes to control a vehicle control system; 7) locking and unlocking doors with ignition on or off; 8) allowing service valet mode; 9) allowing for remote keyless entry in valet mode; 10) allowing for passive power door lock activation; 11) allowing for noise pollution control; 12) operating a siren or other sound indicators at various decibels, including 125 decibels; 13) providing one or more sounds, which progress in duration or decibel level, for example, for assistance with attempts to locate a vehicle; and 14) providing a remote vehicle start feature that allows for the starting of a vehicle remotely.

The feature set module 12 may also be utilized to provide one or more physical, visual, or sound indications upon the occurrence of one or more of the following events in connection with a vehicle and/or user of a vehicle such as: 1) the unlocking of doors; 2) the unlocking of a trunk or hatch; 3) the detection of a predetermined amount or range of vibration that is indicative of unusual vibration occurring to a vehicle, as indicated by a shock sensor; 4) attempts to activate a starter that has been disabled; 5) attempts to deactivate a starter that has been enabled; 6) acts occurring within the interior of a vehicle, as indicated by an interior theft sensory that could be associated with attempts of theft; 7) acts to engage the brake of a vehicle when the brake has been deactivated; and 8) impacts to the vehicle of various degrees.

In addition, in the vehicle control system 10, according to another exemplary embodiment of the present invention, the feature set module 12 can be programmed to provide, for example, one or more physical, visual, or sound indicators, with or without the occurrence of any one or more of the above-described events. For example, the feature set module 12 can be programmed to contribute to control: 1) the flashing of lights on a vehicle at various speeds, such as the parking lights; 2) the emission of emitting sounds from a vehicle, such as one or more chirps, musical notes, portions of songs, and/or human-voice sounds upon the arming or disarming of features of a vehicle control system; 3) the illumination of one or more entries to a vehicle; 4) the illumination of one or more exits from a vehicle; 5) the honking of a horn of the vehicle; 6) the activation of a human-voice and/or real panic-like sound from a vehicle component, such as a horn; and 7) the sounding of an alarm for one or more periods of times.

The feature set module 12 may also be utilized to program other functions/features of a vehicle control system according to an exemplary embodiment of the present invention. Both the following and above described features may be integrated within the vehicle control system 10 or designated by the feature set module 12 to be output from one or more auxiliary or unused ports. For example, feature set module 12 may also be programmed to contribute to controlling the following features/functions: 1) starting a car remotely; 2) illuminating lights of a vehicle, such as headlights remotely; 3) operating a power sliding door; 4) operating a power sunroof; 5) operating a power window; 6) operating a vehicle seat, for example, placing the seat in a position, according to the seat position stored in the memory of the module and/or vehicle control system; 7) unlocking one or more doors, such as the driver's door before unlocking other doors; 8) overriding an interior theft sensor; 9) reducing the current usage from the vehicle control system; 10) placing the vehicle control system in hibernation sleep mode to avoid drain on the battery; 11) interfacing with a home control system; 12) interfacing with a garage control system; 13) interfacing with other alarm or control systems, which may be produced by other manufacturers; 14) identifying which sensors have been tripped; 15) deactivating lost remote controls/transmitters associated with a vehicle control system; 16) securing an emergency override button; 17) engaging the starter motor anti-grind circuit; 18) controlling front and rear window defrosters; 19) controlling hood pin switch safety features; 20) to control neutral safety switch input; 21) to placing the vehicle in diesel mode, which will determine how long to activate the starter; and 22) selecting how long to activate a vehicle's starter according to a particular vehicle's requirements.

The control system 10 also provides for serial communication inputs and outputs, which may be referred to as a multiplex input/output system. The multiplex input/output system provides a method of communication with accessories or ancillary control modules via a 2-way-3-wire connection. This allows for complex command sets to be sent and/or received via a low number of inputs and outputs. The serial communication inputs and outputs can be utilized to interface with hand-held electronic devices, various telematics products, such as cell phones, vehicle control modules, etc.

The control system 10 also provides for a high security code override feature. The feature provides for a simple bypass of the security code access requirement in case of the loss of or damage to the remote control transmitter. The simple bypass uses a hidden button in conjunction with the ignition being in the "on" state. The high security code override feature may require that certain inputs and outputs be stimulated in a sequence by the user. Performing the function or functions that constitute the high security code override will correspond to inputting a PIN that will allow the system to disarm.

The control system 10 may further include one or more circuits, including a microprocessor and support circuits, mounted on a circuit board. For example, the support circuits may include an LVI, EEPROM, clock, and watchdog circuit. The support circuits may either be discrete circuits or circuits integral to the microprocessor circuit. The input/output lines of the circuitry may have a series resistance in each line to protect the module circuitry from ESD charges. In addition, every connection that is an input to the microprocessor may be associated with a pull-up or pull-down resistor. As explained herein, the circuitry of the feature set module 12 can be programmed or configured to provide a variety of features and functions. The following chart illustrates the possible functionality of each pin receptacle of the feature set module 12:

| Port | Function | I/O | DIP pin | QFP pin | H1 | H2 | H3 | H4 | H5 | H6 | Programmer |
|---|---|---|---|---|---|---|---|---|---|---|---|
| PB0 | Shock LED | Output | 1 | 40 | 19 | | | | | | |
| PB1 | RF Power Save | Output | 2 | 41 | 11 | | | | | | |
| PB2 | Factory Arm | Output | 3 | 42 | 39 | 2 | | | | | |
| PB3 | Factory Disarm | Output | 4 | 43 | 40 | 4 | | | | | |
| PB4 | Door Trigger | Input | 5 | 44 | 12 | | 20 | | | | |
| PB5 | Parking Lights | Output | 6 | 1 | 15 | | 1 | | | | MOSI |
| PB6 | 2$^{nd}$ Door Unlock | Output | 7 | 2 | 10 | | 24 | | | | MISO |
| PB7 | Trunk Pin | Input | 8 | 3 | 5 | 8 | | | | | SCK |
| | External Sensor | | | | | 15 | | | | | |
| *RESET | *Reset/LVI | Input for Programming | 9 | 4 | 43 | | | | | | *Reset |
| PD0 | Green LED (LED2) | Output | 10 | 5 | 37 | | 22 | | | | |
| | Multiplex In | | | | | 6 | | | | | |
| PD1 | Red LED (LED1) | Output | 11 | 7 | 13 | | 23 | | | | |
| | Multiplex Out | | | | | | 10 | | | | |
| PD2 | Shock Sense | Input | 12 | 8 | 16 | | | | | | |
| PD3 | Tach In | Input | 13 | 9 | 27 | | | 9 | | | |
| PD4 | Lock Motor Sense (Rogue Arm) | Input | 14 | 10 | 2 | | 2(dup) | | | | |
| | Brake | | | | | | | 7 | | | |
| PD5/OC1A | Siren | Output | 15 | 11 | 14 | | 16 | | | | |
| PD6 | Dome Light | Output | 16 | 12 | 32 | | 3 | | | | |
| PD7 | Lock Switch Sense (CSM Ext Trigger) | Input | 17 | 13 | 6 | | 11 | | | | |
| PA0 | Ignition 1/Ignition2 | Output | 39 | 37 | 25 | | 7(dup)/— | —/3 | | | |
| | HVAC1/HVAC2 | | | | | | —/— | 4/5 | | | |
| PA1 | Ignition Key | Input | 38 | 36 | 28 | | 7(dup) | | | | |
| PA2 | Car Start Active | Output | 37 | 35 | 7 | | 10 | | | | |
| PA3 | Aux 1 | Output | 36 | 34 | 29 | 10 | 9 | | | | |
| PA4 | Aux 2 | Output | 35 | 33 | 8 | 11 | | | | | |
| PA5 | Aux 3 | Output | 34 | 32 | 30 | 12 | | | | | |
| PA6 | Aux 4 | Output | 33 | 31 | 9 | 13 | | | | | |
| PA7 | Unlock Motor Sense (Rogue Disarm) | Input | 32 | 30 | 31 | | 14(dup) | | | | |
| | Trunk Sense | | | | | | 13(dup) | | | | |
| | Starter Key | | | | | | 6 | | | | |
| ICP | RF In | Input | 31 | 29 | 33 | | | 4 | | | |
| OC1B | Horn | Output | 29 | 26 | 36 | | 21 | | | | |
| PC0 | Starter Kill | Output | 21 | 18 | 41 | | | | | | |
| | Armed out | | | | | 14 | | | | | |
| PC1 | Trunk Release | Output | 22 | 19 | 38 | | 13(dup) | | | | |
| PC2 | Lock | Output | 23 | 20 | 17 | | 2(dup) | | | | |
| PC3 | Unlock | Output | 24 | 21 | 18 | | 14(dup) | | | | |
| PC4 | Unlock Switch Sense | Input | 25 | 22 | 3 | | 12 | | | | |
| | Neutral Safety | | | | | | | 8 | | | |
| PC5 | Hood Pin | Input | 26 | 23 | 34 | | 19 | | | | |
| PC6 | Disarm/Override Button | Input | 27 | 24 | 35 | | 18 | | | | |
| PC7 | Starter Motor Drive | Output | 28 | 25 | 4 | | 8 | | | | |
| VCC | | | 40 | 38 | 22, 23 | | | | | | VCC |
| GND | | | 20 | 16 | 1, 44 | | | | | | GND |
| XTAL2 | | | 18 | 14 | | | | | | | |
| XTAL1 | | | 19 | 15 | | | | | | | |
| ALE | | | 30 | 27 | | | | | | | |
| N/c | | | | | 20 | | | | | | |
| N/c | | | | | 21 | | | | | | |
| N/c | | | | | 24 | | | | | | |
| N/c | | | | | 26 | | | | | | |
| N/c | | | | | 42 | | | | | | |
| | Lock Switch (87a) | | | | | | 1 | | | | |
| | Unlock Switch (87a) | | | | | | 3 | | | | |
| | n/c | | | | | | 5 | | | | |
| | n/c | | | | | | 7 | | | | |
| | Trunk Switch (87a) | | | | | | 9 | | | | |
| | Door Trigger Pull-Up | | | | | | 16 | | | | |
| | +Battery | | | | | | | 4 | | | |
| | Ground | | | | | | | 5 | | | |
| | Siren Feed | | | | | | | 15 | | | |
| | Disarm Ground | | | | | | | 17 | | | |
| | HVAC polarity 2 | | | | | | | | 1 | | |
| | HVAC polarity 1 | | | | | | | | 2 | | |
| | n/c | | | | | | | | 6 | | |
| | RC Power | | | | | | | | | 1 | |
| | GND RF | | | | | | | | | 2 | |
| | RC Kill | | | | | | | | | 3 | |
| | +12 v | | | | | | | | | | 1 |
| | GND Chassis | | | | | | | | | | 2 |

-continued

| Port | Function | I/O | DIP pin | QFP pin | H1 | H2 | H3 | H4 | H5 | H6 | Programmer |
|---|---|---|---|---|---|---|---|---|---|---|---|
| | PATS Ignition | | | | | | | | | | 3 |
| | PATS Starter Motor | | | | | | | | | | 4 |
| | PATS Active Out | | | | | | | | | | 5 |

Figure 7:
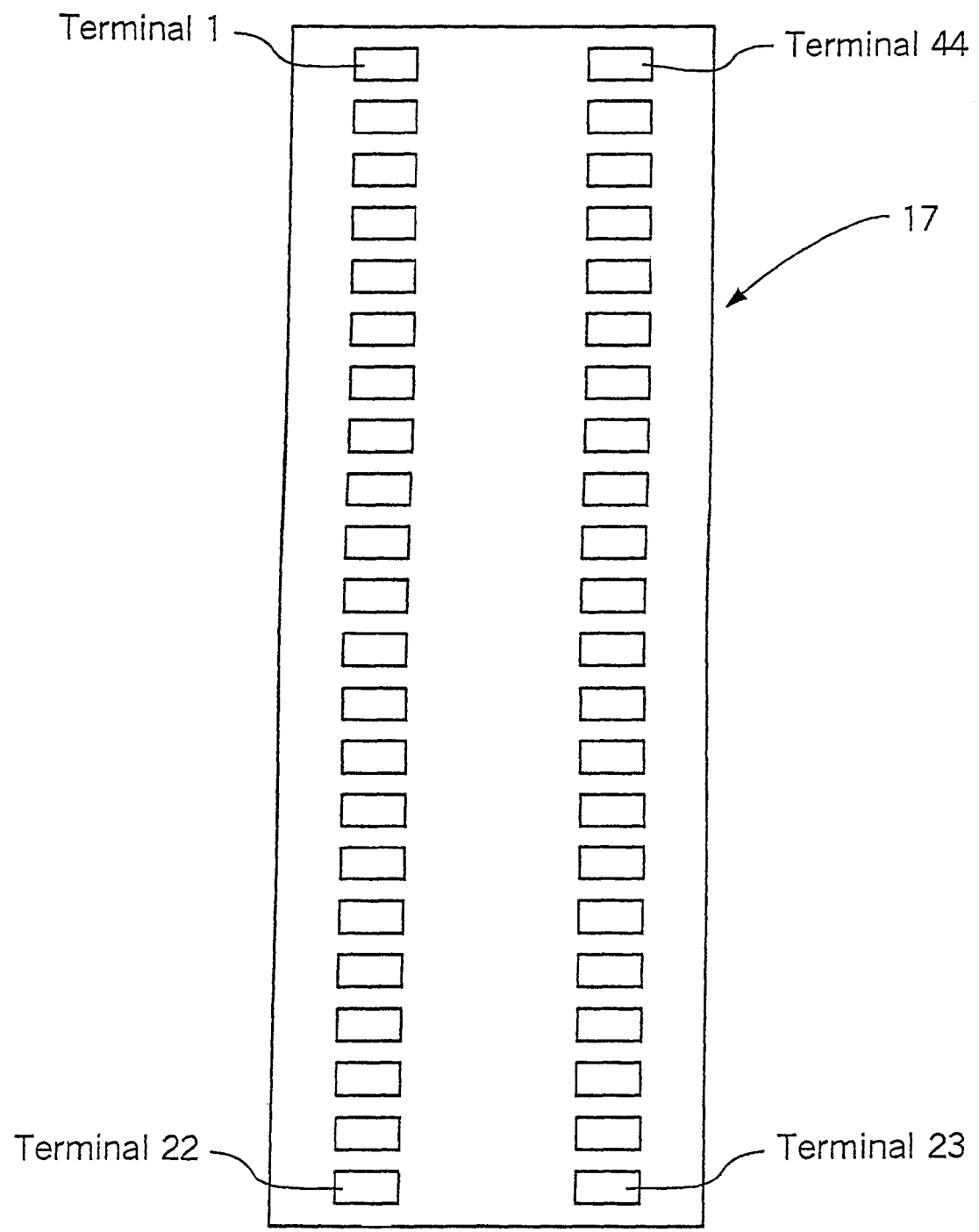
FIG. 7 is a plan view of a connector of the feature set module according to an exemplary embodiment of the present invention.

FIG. 7 illustrates the numbering system of the port 17 of the feature set module 12 according to an exemplary embodiment of the present invention. In the exemplary embodiment, the port 17 includes up to 40 receptacles, positioned and sized to receive and correspond to one or more pins of the port 16 of the housing 14 of the control system 10. The pin receptacles of the connector of the port 17 form two rows in parallel, such that each pin receptacle is positioned to be numbered corresponding to a position of a pin in one of the rows of the pin connector of the housing 14. Likewise, the pin connector of the port 16 of housing 14, has two rows of pins, positioned to be numbered corresponding to a position of a pin receptacle of the feature set module 12. One of the rows includes receptacle positions 1-22, and the other includes positions 23-40. For the connector of the feature set module 12, pin receptacle positions 1 and 40 are located opposite each other at one end of each row, and receptacle positions 23 and 24 are also located opposite each other at the other ends end of each row. Likewise, for the pin connector of the housing 14, pin positions 1 and 40 are located opposite each other at one end of each row, and pin positions 23 and 24 are also located opposite each other at the other ends of each row. The connection may be serial or parallel. Further, it is not necessary that the connector of the feature set module 12 contain 40 pin receptacles. Similarly, it is not necessary that the connector of the interface module 15 contain 40 pins. Rather, at least one pin receptacle of the feature set module 12 must have corresponding functionality as follows:

In accordance with yet another exemplary embodiment of the present invention, at least one of the receptacles corresponds to positions 1-24, and such receptacle or receptacles relates to ground. In accordance with another exemplary embodiment of the present invention, at least one of the receptacles corresponds to positions 1-24, and such receptacle or receptacles relates to power. In accordance with another exemplary embodiment of the present invention, at least one of the receptacles corresponds to positions 1-24, and such receptacle or receptacles relate to the starter motor. In accordance with yet another exemplary embodiment of the present invention, at least one of the receptacles corresponds to positions 1-24, and such receptacle or receptacles relate to parking lights.

In another exemplary embodiment of the present invention, at least one of the receptacles corresponds to positions 1-24, and such receptacle or receptacles relate to locking the doors and/or arming features of a vehicle's control system. In yet another exemplary embodiment of the present invention, at least one of the receptacles corresponds to positions 1-24, and such receptacle or receptacles relate to unlocking and/or disarming features of a vehicle's control system.

An electronic system according to the present invention can be utilized to define features/functions of a vehicle control system. The programmable features described above provide a variety of safety, security, comfort and convenience functions to a vehicle control system and/or user of a vehicle control system. For example, according to the present invention, a module can be programmed to enable one transmitter to operate the vehicle control systems of up to two vehicles. Therefore, a user of two vehicles will not have a different transmitter for each vehicle. In addition, up to eight transmitters can be programmed to control a single module. In addition, the features or functions provided by a vehicle control system in accordance with the present invention may be determined by settings of the transmitter.

Another programmable feature of the present invention is the ability to lock and unlock power doors and or sliding doors using a transmitter. Thus, a user of a vehicle control system can lock and unlock doors without a key. Yet another feature of the feature set module 12 of the present invention is the ability to prioritize which doors will be unlocked first. Additionally, the feature set module 12 may be programmed to enable the delivery of a sound or emission of light upon the locking and unlocking of a door and/or the arming and/or disarming of a security system. Thus, a user will be able to audibly or visibly verify the performance of the respective function.

In addition, the feature set module 12 may be programmed to enable the starting of vehicle by using a transmitter. Thus, a user will be able to start a vehicle without using a key. Further, a user may be able to start a vehicle without using a key, and maintain the arming of security features, such as locked doors. Also, because the feature set module 12 can be programmed to deliver visual, physical and/or sound indicators upon the occurrence or non-occurrence of an event when, for example, sensors, such as a light touch detector or interior theft detector are activated, the feature set module 12 may be programmed to deliver one or more of physical, sound, or visuals indicators. The delivery of one or more indicators, upon the activation of a sensor, will serve as a deterrent to threats to the security of a vehicle or safety of a user.

Another feature that may be programmed by the feature set module 12, according to the present invention is the ability to deactivate lost remotes. This feature will also serve to protect the safety and security of a vehicle and/or user of a vehicle.

It should also be appreciated that the feature set module 12 may be reset or contain inputs/outputs for the addition and/or changing of functions that the feature set module 12 can be programmed to provide. This is especially important because the requirements of a user of a vehicle control system may change. In addition, as technology evolves, a user of a vehicle control system may desire additional or evolved features. According to the feature set module 12 of the present invention, the many features described herein, and others, may be programmed into the feature set module 12.

The feature set module 12 and/or the software cartridge 48, according to the present invention, can be easily programmed. For example, the feature set module 12, according to the present invention may be programmed using the Internet or an intranet. For example, the feature set module 12 and/or the software cartridge 48 may be programmed using the Internet by establishing communication between a computer processing device, the Internet and the feature set module 12 and/or the software cartridge 48. For example, consumers utilizing the Internet may pay for the ability to configure the vehicle control system over the Internet, enter an identification number corresponding to the type or configuration of the feature set module 12 and/or the software cartridge 48 that is in the consumer's possession, and download the features desired to the feature set module 12 and/or the software cartridge 48 directly or indirectly using the Internet. It should also be appreciated that the feature set module 12 and/or the software cartridge 48 could be programmed using a software package, such as one stored on a computer processing device, instead of the Internet.

It should be understood that the features of the vehicle control system 10, in accordance with the present invention, can be programmed using a variety of methods including 1) use of an on-board processor or an external device, that can be programmed by establishing RF communication; or 2) use of a telematics device that can program the features of the vehicle control system 10 via software present with the telematics product or software residing on the internet, which may be in direct connection with the telematics product.

Additionally, because the feature set module 12 and/or the software cartridge 48 can be easily programmed, directly or indirectly, using software accessible through the Internet, an intranet, or a computer, the vehicle control system 10 according to the present invention can be adapted to meet the desires of many users, by simply programming different feature sets into the feature set module 12 and/or the software cartridge 48. The interface module 15 is universal device, and is designed to accommodate any feature that a user desires.

Often, the features that have high priority among users tend to be similar for users in different locales. Thus, the interface module 15 can be an original equipment alarm device in vehicles that allows dealers of vehicles to configure the features of the alarm system according to the features desired by users in their region. In addition, a dealer can provide an extra service to their customers by being able to configure features that are unique to a particular purchaser. As a result, an original manufacturer of a vehicle does not have to pre-configure different features for vehicles, according to who the vehicle will be sold. Thus, the original manufacturer of a vehicle will have additional flexibility in selling the manufactured vehicles without being limited to only selling certain vehicles to certain dealerships.

Figure 8:
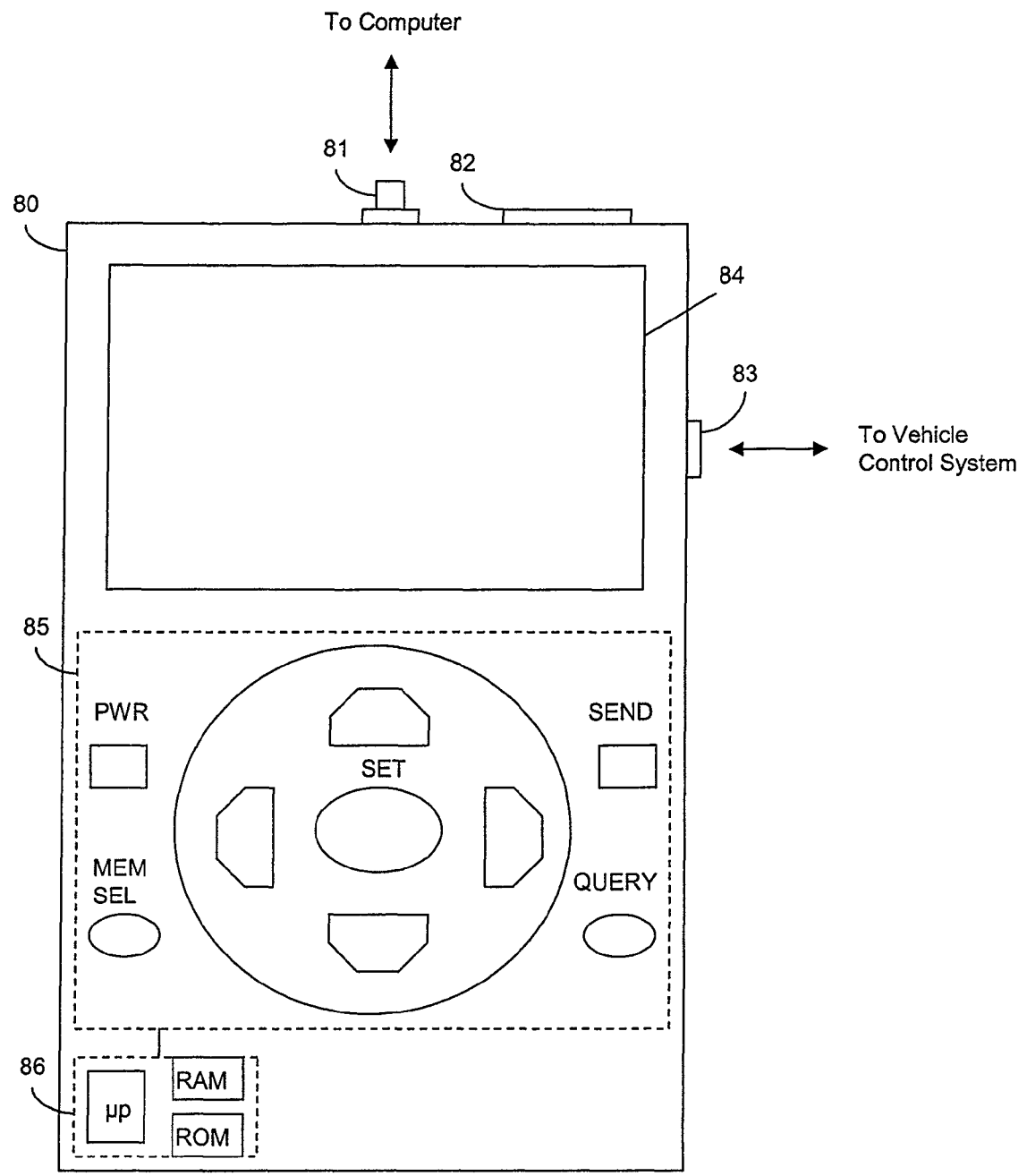
FIG. 8 is a remote programmer according to another exemplary embodiment of the present invention.

FIG. 8 illustrates a remote programmer 80 for use with the vehicle control system 10 according to an exemplary embodiment of the present invention. As shown in FIG. 8, the remote programmer 80 includes a universal security bus (USB) interface 81, a memory card interface 82, an RF transmitter 83, a display 84, an input 85, and a control circuit 86.

The USB interface 81 is used to communicate with an external computer 91 via a USB cable 95 (both shown in FIG. 9), thus forming a communication link between the remote programmer 80 and the computer 91, over which, for example, data may be transmitted. The data that is provided by the computer 91 to the remote programmer 80 is typically related to programming the feature set module 12 and/or the software cartridge 48 to provide various features and/or functions to the vehicle control and/or alarm system 10. The memory card interface 82, which may be a smart card media slot, is also used to provide data to the remote programmer 80 that is related to programming the feature set module 12 and/or the software cartridge 48.

The RF transmitter 83 is used to wirelessly transmit the data associated with programming the feature set module 12 and/or the software cartridge 48 or operating the control system 10 remotely. In addition, the RF transmitter 83 can be used to transmit signals related to programming certain features of a remote control device 97 (shown in FIG. 9).

The display 84 is used, for example, to provide a graphical representation of the various features and/or functions that are to be programmed into the feature set module 12 and/or the software cartridge 48. The display 84 may also include a graphical user interface (GUI) for enabling a user to enter commands and/or requests into the remote programmer 80 by, for example, scrolling through a list of features that are stored in the remote programmer 80 that may be programmed into the feature set module 12.

The input 85 is a keypad that includes a variety of buttons and/or switches associated with commands and/or requests such as, power on, memory select, query, send, etc. The commands and/or requests available on the input 85 are associated with, for example, programming the feature set module 12 and/or the software cartridge 48 or operating the control system 10 remotely. It is to be understood, however, that the input 85 may also be in the form of the GUI on the display 84.

As further shown in FIG. 8, the control circuit 86 includes a microprocessor, a random access memory (RAM) and a read only memory (ROM). The control circuit 86 is used to control the operations of the remote programmer 80. Thus, for example, when a user queries the remote controller 80 via the input 85, a signal associated with the query is transmitted to the control circuit 86, and the control circuit 86 executes the query, which may be a request to receive a list of updated features and/or functions for programming the feature set module 12, from the computer 91, by transmitting a signal associated with the query to the computer 91. The control circuit 86 is also used to store information such as features and/or functions associated with programming the feature set module 12 and/or other electronic components connected to the control system 10. The information may be stored in the ROM or any other type of storable memory component such as an EEPROM.

Figure 9:
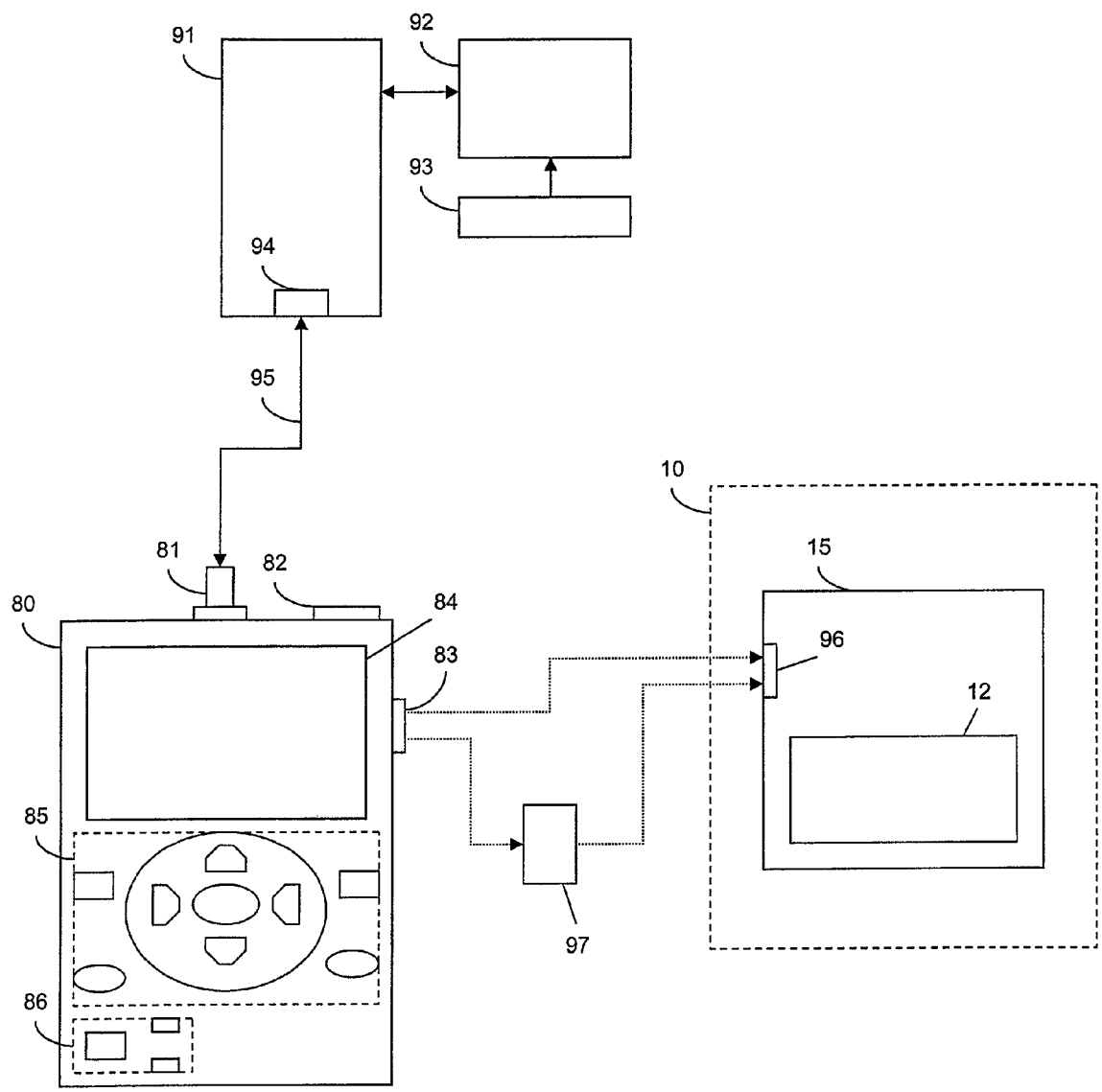
FIG. 9 is a block diagram of a system for remotely programming the feature set module according to yet another exemplary embodiment of the present invention.

FIG. 9 illustrates a block diagram of a system 90 for remotely programming the control system 10 according to an exemplary embodiment of the present invention. As shown in FIG. 9, the computer 91 is coupled to the remote programmer 80 by the USB cable 95 connected to a USB interface 94 and the USB interface 81. The computer 91 is further coupled to a display 92 and an input 93 such as a keyboard.

The computer 91 includes information associated with functions and/or features that may be programmed into the feature set module 12 and/or software cartridge 48, which are stored, for example, in a memory device (not shown) of the computer 91. The following chart illustrates an example of the data (e.g., Feature Banks 1 and 2) stored in the computer 91 that may be provided to the remote programmer 80.

| Feature Set Module Programming Options | | | | | Default |
|---|---|---|---|---|---|
| Remote Programmer Options | | | | | |
| Security | ON | OFF | | | ON |
| Remote Start | ON | OFF | | | ON |
| Feature Bank 1 | | | | | |
| Door Lock/Unlock | 1 Sec | 3.5 Sec | 1 Sec L, Db1 U/L | | 1 Sec |
| Accy Lock | Auto Lock ON | Auto Lock OFF | | | ON |
| Accy Unlock | Auto Unlock ALL | Auto Unlock DR | Auto UL OFF | | OFF |
| Headlights AUX 1 | ON Arm | On Disarm | ON Both | Off | Both |
| Passive Locks | Passive | Active | | | Active |
| Passive/Active Arm | Passive Arm | Active Arm | | | Active Arm |
| Siren/Horn | Siren/Horn | Siren | Horn Only | | Siren/Horn |
| Horn Chirp | 10 mS | 16 mS | 30 mS | | 16 mS |
| Custom Code | ON | OFF | | | OFF |
| Step Unlock | ON | OFF | | | OFF |
| Chirp Delete from TX | ON | OFF | | | OFF |
| Trunk Output Timing | Push & Hold | 20 Secs | | | Push & Hold |
| AUX 1 | Push & Hold | 10 Sec | 20 Sec | Latched | Push & Hold |
| AUX 2 | Push & Hold | 10 Sec | 20 Sec | Latched | Push & Hold |
| AUX 3 | Push & Hold | 10 Sec | 20 Sec | Latched | Push & Hold |
| AUX 4 | Push & Hold | 10 Sec | 20 Sec | Latched | Push & Hold |
| Feature Bank 2 | | | | | |
| RF Start Chirp | OFF | ON | | | ON |
| RUN Time | 5 Min | 10 Min | 15 Min | 20 Min | 10 Min |
| Parking Lights | ON Steady | Flash | | | Steady |
| Input Voltage | Voltage/Tachless | Tach | | | Tach |
| Voltage Level | >.5 V B4 Start | <.5 V B4 Start | | | >.5 V |
| Crank Average/Crank Time | Average | Time | | | Average |
| Crank Time | .8 Sec | 1.0 Sec | 1.5 Sec | 2.0 Sec | 1.0 Sec |
| Diagnostics | OFF | ON | | | OFF |
| Gas/Diesel | Gas | Diesel 10 | Diesel 15 | Diesel 20 | Gas |
| Trans O/P | While RS ON | During Start | Until Ign OFF | | While RS |
| Temp Start | OFF | ON | | | OFF |
| Single/Double Start TX activate | Single | Double | | | Double |

As further shown in FIG. 9, a user possessing the remote programmer 80 may query the computer 91, over the communication link established by the USB cable 95, for providing updated features and/or functions associated with programming the feature set module 12 and/or software cartridge 48. This is accomplished by inputting a request at the input 85 or a GUI on the display 84 for receiving one or more new features and/or functions associated with programming the feature set module 12 from the computer 91. After the request is transmitted, the computer 91 provides the new features and/or functions to the remote programmer 80, and the features and/or functions are stored in a memory unit of the control circuit 86.

Upon receipt of the new features and/or functions, the user may then scroll through a list of the new features and/or functions and determine which features and/or functions they desire to program to the feature set module 12 and/or software cartridge 48. After the new features and/or functions are selected, they are transmitted to the control system 10 via the RF transmitter 83. This may be accomplished by pressing a "send" button on the remote programmer's 80 input 85.

After the features and/or functions are received at the control system 10 by an RF receiver 96 in the interface module 15, they are programmed into the feature set module 12 and/or software cartridge 48 by, for example, storing them in an EEPROM. The remote programmer 80 will then be able to remotely execute the updated features and/or functions on electronic devices connected to the control system 10.

As further shown in FIG. 9, the remote transmitter 97 may be programmed by the remote controller 80 via the above process to update features on the remote transmitter 97 such as updated musical tunes. In addition, the remote programmer 80 may also be used to provide new features and/or functions to media devices such as mobile video displays and/or video players connected to the control system 10.

The remote programmer 80 may also receive the features and/or functions that may be programmed into the feature set module 12 and/or software cartridge 48 from a memory card that is inserted in the memory card interface 82. This is accomplished by, for example, storing the features and/or functions in the memory card at the computer 91, and then reading the data on the memory card after it is inserted into the memory card interface 82.

It is to be understood that the features and/or functions for programming the feature set module 12 and/or software cartridge 48 may be requested and received via an RF transceiver over, for example, a wireless Bluetooth connection from a Bluetooth equipped device. In addition, the same RF transceiver may also be used to transmit the features and/or functions to the feature set module 12 and/or software cartridge 48. It is to be further understood that features and/or functions for programming the feature set module 12 and/or software cartridge 48 may be requested and received via an Ethernet, FireWire and/or IR connection.

In accordance with yet another embodiment of the present invention, a remote programmer may be configured as a single and/or dual button remote transmitter. In this configuration, the remote programmer can receive features and/or functions for programming the feature set module 12 and/or software cartridge 48 via an IR transceiver included in the remote programmer. The remote programmer may then transmit the features and/or functions using its IR transceiver to the interface module 15, which may receive the features and/or functions via an IR receiver included therein.

In this embodiment, the remote programmer may be pre-programmed (e.g., by storing the features and/or functions its internal circuitry) to be a single use device for only programming specific features and/or functions (e.g., keyless entry, keyless entry and alarm, keyless entry with remote start, etc.) onto the interface module 15. After the features and/or functions are programmed onto the interface module 15, the remote programmer's programming capability is removed. This may occur, for example, by transmitting a blanking code from the interface module 15 to the remote programmer after it has been programmed, thus rendering the remote programmer obsolete.

In another embodiment of the present invention, the remote controller 80, which includes an RF transceiver, can be used to transmit a query to the electronic devices connected to the control system 10 in an effort to determine the electronic devices' particulars such as, for example, their manufacturers. The electronic devices can respond to the query by providing their particulars to the remote controller 80, which may then be graphically illustrated on the display 84. In this manner, the remote controller 80 can determine if certain electronic devices connected to the control system 10 have been installed by another manufacturer. Thus, enabling the electronic devices of another manufacturer to be programmed via the remote programmer 80 using software provided by their manufacturer, which may be available, for example, through the internet.

It should be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A device for use in a vehicle, comprising: a plurality of connectors that connect the device to vehicle components, wherein the vehicle components are operated pursuant to a feature set of electronically operable functions; a memory that stores codes for defining the feature set of electronically operable functions; a module that adapts the device to connect to a control unit that is disposed inside a vehicle through a serial communications interface, wherein the control unit is part of a security system installed in the vehicle, and the security system is provided with new functionality based on the codes stored in the memory, and wherein the module further comprises codes for adapting the device to connect to different control units inside different vehicles.

2. The device of claim 1, wherein command sets are sent to and/or received from the control unit through the serial communications interface.

3. The device of claim 1, wherein the serial communications interface comprises a two-way interface having at least one wire.

4. The device of claim 1, wherein the memory is configurable by the module.

5. The device of claim 1, wherein the memory is programmable.

6. The device of claim 5, wherein the memory is programmed with new codes for defining the feature set of electronically operable functions by the module.

7. The device of claim 1, wherein the plurality of connectors and the memory are included in a base unit and the module is configured to detachably couple to the base unit.

8. The device of claim 7, wherein the module is configured to detachably couple to the base unit without connecting/disconnecting wires.

9. The device of claim 1, wherein the plurality of connectors are pin connectors.

10. The device of claim 1, wherein the device is operable via remote control.

11. The device of claim 1, wherein the security system includes remote start or remote keyless entry functionality.

12. A system for a vehicle, comprising:
a device, comprising:
a plurality of connectors that connect the device to vehicle components, wherein the vehicle components are operated pursuant to a feature set of electronically operable functions; a memory that stores codes for defining the feature set of electronically operable functions; and
a module that adapts the device to connect to a control unit that is disposed inside a vehicle through a serial communications interface,
wherein the control unit is part of a security system installed in the vehicle, and the security system is provided with new functionality based on the codes stored in the memory; and a remote control that controls the electronically operable functions of the device; wherein the plurality of connectors and the memory are included in a base unit and the module is configured to detachably couple to the base unit.

13. The system of claim 12, wherein the remote control comprises a transceiver.

14. The system of claim 12, wherein a range of the remote control is extendible.

15. The device of claim 1, wherein the module comprises a programmable memory.

* * * * *